US010721097B2

(12) United States Patent
Nandoori et al.

(10) Patent No.: US 10,721,097 B2
(45) Date of Patent: Jul. 21, 2020

(54) DYNAMIC SCALING OF VIRTUAL PRIVATE NETWORK CONNECTIONS

(71) Applicant: Microsoft Technology Licensing, LLC, Redmond, WA (US)

(72) Inventors: Ashok Nandoori, Sammamish, WA (US); Abhishek Tiwari, Woodinville, WA (US); Mohit Garg, Redmond, WA (US); Shivakumar Thangapandi, Redmond, WA (US); Abhishek Gupta, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 282 days.

(21) Appl. No.: 15/961,801

(22) Filed: Apr. 24, 2018

(65) Prior Publication Data

US 2019/0327112 A1 Oct. 24, 2019

(51) Int. Cl.
  *H04L 12/46* (2006.01)
  *H04L 12/803* (2013.01)
  *H04L 12/26* (2006.01)
  *H04L 29/08* (2006.01)
(52) U.S. Cl.
  CPC .......... *H04L 12/4641* (2013.01); *H04L 43/16* (2013.01); *H04L 47/125* (2013.01); *H04L 67/10* (2013.01)
(58) Field of Classification Search
  CPC ... H04L 12/4641; H04L 43/16; H04L 47/125; H04L 63/0272
  See application file for complete search history.

(56) References Cited

U.S. PATENT DOCUMENTS

| 7,689,722 | B1 | 3/2010 | Timms et al. |
| 8,020,203 | B2 | 9/2011 | Kumar et al. |
| 2010/0131960 | A1 | 5/2010 | Suganthi et al. |
| 2014/0101317 | A1 | 4/2014 | Yoon |

(Continued)

FOREIGN PATENT DOCUMENTS

| EP | 3116171 A1 | 1/2017 |
| WO | 0192997 A2 | 12/2001 |

OTHER PUBLICATIONS

"International Search Report and Written Opinion Issued in PCT Application No. PCT/US2018/062357", dated Jan. 31, 2019, 15 Pages.

(Continued)

*Primary Examiner* — Kodozovi Acolatse
*Assistant Examiner* — Farhad Ali
(74) *Attorney, Agent, or Firm* — Liang IP, PLLC

(57) ABSTRACT

Techniques for dynamically scaling instances of virtual private network (VPN) gateway in a cloud computing system are disclosed herein. In one embodiment, a method includes determining whether a number of packets processed by a first instance of the VPN gateway exceeds a preset threshold. In response to determining that the number of packets exceeds the preset threshold, a new security association (SA) corresponding to a portion of the VPN network traffic is created. Upon completion of creating the SA, a load balancing policy at a load balancer is modified to forward a portion of the network traffic to a second instance of the VPN gateway when an incoming packet contains a security parameter index (SPI) corresponding to the created SA in its EPS header.

20 Claims, 8 Drawing Sheets

(56) References Cited

U.S. PATENT DOCUMENTS

2016/0212098 A1* 7/2016 Roch .................... H04L 63/029
2017/0171158 A1* 6/2017 Hoy ..................... H04L 63/102
2019/0166040 A1   5/2019 Tiwari et al.

OTHER PUBLICATIONS

"Non Final Office Action Issued in U.S. Appl. No. 15/826,135", dated Jun. 26, 2019, 16 pages.
"International Search Report and Written Opinion Issued in PCT Application No. PCT/US19/026231", dated Jul. 18, 2019, 11 Pages.
Son, et al., "Protego: Cloud-Scale Multitenant IPsec Gateway", In Proceedings of the USENIX Annual Technical Conference, Jul. 12, 2017, 14 Pages.
"Final Office Action Issued in U.S. Appl. No. 15/826,135", dated Oct. 2, 2019, 16 Pages.

* cited by examiner

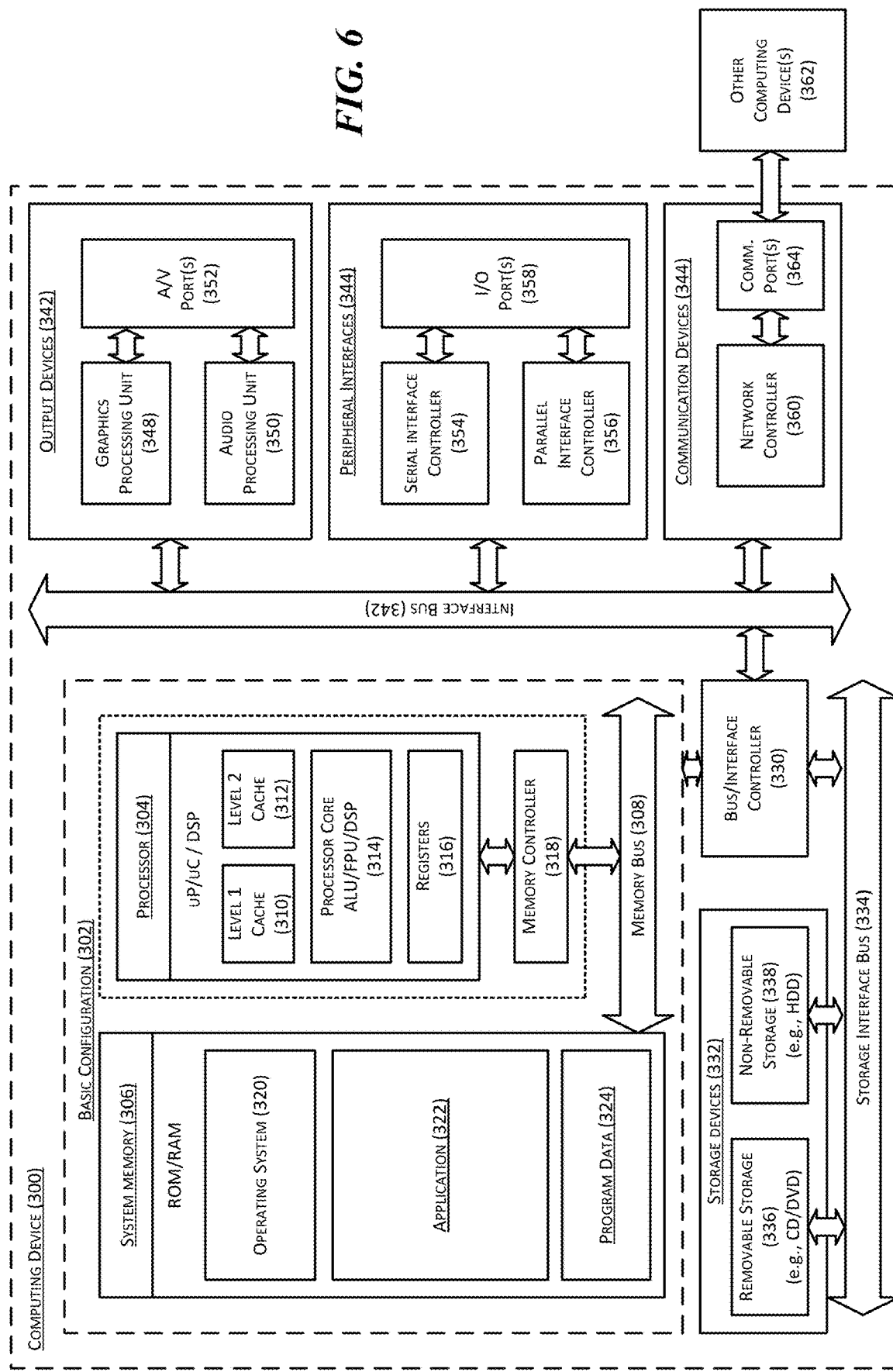

DYNAMIC SCALING OF VIRTUAL PRIVATE NETWORK CONNECTIONS

BACKGROUND

A virtual private network (VPN) extends a private network across a public network such as the Internet. A VPN enables users of the private network to send and receive data across a shared or public network as if being directly connected to the private network. Applications running across the VPN can therefore benefit from functionality, security, and management of the private network. For example, a VPN can allow employees of a corporation to securely access an intranet of the corporation remotely. In another example, a VPN can also be used to securely interconnect geographically remote offices of the cooperation into a global computer network.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A VPN can be accessed via secured virtual connections between pairs of VPN gateways (sometimes also referred to as "VPN servers," "VPN routers," or "security gateways") and/or VPN clients (e.g., a remote computer). The VPN gateways can be configured to implement suitable authentication, tunneling, and encryption protocols and facilitate corresponding operations. For example, a VPN gateway can be configured to authenticate VPN connection requests from, for instance, a VPN client or other VPN gateways. Upon authentication, the VPN gateway can establish a VPN connection by assigning a private network address, configuring a VPN tunnel via encapsulation/decapsulation and/or encryption/decryption of payloads of packets, or performing other suitable functions.

In one implementation, a company, cooperation, or other suitable types of organization can have an on-premise network, for example, a private local area network (LAN) deployed in an office to interconnect on-premise servers and computers. The organization can also subscribe and have access to a virtual network (VNET) hosted on a remote cloud computing system via a public network such as the Internet. To secure communications between the LAN and VNET, the virtual network of the organization can deploy a VPN gateway to interface with, for example, a network router (referred to as "on-premise gateway" herein) at the on-premise network to establish a VPN tunnel via a public network by implementing Internet Protocol Security (IPsec) or other suitable secure communications protocols.

In operation, the on-premise gateway and the VPN gateway can send and receive encrypted network traffic via the VPN tunnel across the public network as if the virtual network is directly connected to the on-premise network via a dedicated communications link. For example, the on-premise gateway can receive and forward flows of packets from multiple computers of the on-premise network to multiple virtual machine (VMs) at the virtual network via the VPN tunnel. Upon receiving the packets, a load balancer (LB) at the cloud computing system can determine a suitable destination for the packets according to, for instance, a source IP address, a destination IP address, and a protocol value contained in an IP header of the packets. Based on these values, the LB can then forward the packets to an instance of the VPN gateway to be decrypted or otherwise processed according to the IPsec protocol or other secure communications protocols. The instance of the VPN gateway can then forward the decrypted packets or payloads thereof to corresponding VMs for further processing.

The foregoing operations, however, have certain drawbacks. For example, all network traffic between the on-premise network and the virtual network is typically transmitted through a single VPN tunnel between the on-premise gateway and the VPN gateway. For instance, according to Version 2 of the Internet Key Exchange (IKEv2), a control channel (e.g., an IKE SA) between the on-premise network and the virtual network can be initially established, for instance, via a pre-shared key, signatures, or public key encryption. The control channel can then be used by the on-premise and VPN gateways to perform suitable key exchange negotiations to generate a secret key to encrypt further communications. Such negotiations result in a single bi-directional data channel (e.g., an IPsec SA) that can be used to carry all network traffic between endpoints in the address space of the on-premise network and those at the VNET in the cloud computing system. All network traffic is also processed at the cloud computing system by a single instance of the VPN gateway. Such reliance on a single VPN data channel or a single instance of the VPN gateway may cause communications lags due to insufficient network bandwidths at the VPN tunnel and/or insufficient processing power at the VPN gateway. Such communications lags may negatively impact user experience of various cloud services provided by the cloud computing system.

Several embodiments of the disclosed technology can address at least some aspects of the foregoing difficulty by implementing a gateway scaler configured to dynamically scale a number of data channels and instances of the VPN gateway for facilitating communications between the on-premise network and the virtual network. In one implementation, the gateway scaler can be configured to monitor one or more of operating parameters of a VPN connection at a currently used instance of the VPN gateway. Example operating parameters can include a network bandwidth consumed, a number of packets sent/received in a preset period, a processor load on a host hosting the instance of the VPN gateway, or other suitable parameters. In a further example, subsequent to decapsulation and decryption, the gateway scalar can also be configured to identify one or more inner flows between pairs of computers from the on-premise network and VMs at the virtual network, a high bandwidth consuming by each inner flow, or a longevity of one or more of the inner flows. Packets before decapsulation and decryption are referred to herein as belonging to outer flows.

The gateway scaler can also be configured to determine whether the currently used instance of the VPN gateway is overloaded by comparing the monitored operating parameters with a corresponding threshold. For example, when a processor load on the host exceeds 90% or other suitable values, the gateway scaler can indicate that the first instance is overloaded. In another example, when an instantaneous or averaged bandwidth consumed by the VPN tunnel exceeds another threshold, the gateway scaler can indicate that the first instance is overloaded. In a further example, the gateway scaler can also be configured to indicate that the instance is overloaded when network traffic of one or more inner flows between pairs of computers from the on-premise network and VMs at the virtual network exceeds a corresponding threshold, a number of the inner flows exceeds another threshold, and/or a longevity value of one or more inner flows exceeds a corresponding threshold.

In response to determining that the currently used instance of the VPN gateway is overloaded, the gateway scaler can be configured to create one or more new instances of VPN gateway and/or scale the data channels to use additional existing instances of the VPN gateway. Each of the instances of the VPN gateway can have access to a common database containing records of available data channel(s) and corresponding configurations. In one implementation, the gateway scaler or the existing instance can be configured to create new data channels (e.g., new IPsec SAs) using the control channel (e.g., IKE SA) previous established for the VPN tunnel. When creating the new data channels, the gateway scaler can also configure a traffic selector for each new data channel to designate which one or more of the inner flows that, for example, consume high bandwidth or have great longevity, are corresponding to the newly created data channels. During negotiation for the new data channels, network traffic can continue to flow through the existing data channel having a traffic selector that matches an entire range of endpoints. Once the new data channel is created for the designated inner flows, configuration of the newly created data channels can be shared with all the new or existing instances of the VPN gateway.

In one example implementation, the newly created data channels can each correspond to a security logic group. A security logic group can be a group of security parameters that allow secure communications between pairs of computers at the on-premise network and VMs at the virtual network and can contain a traffic selector that designates which inner flows belong to the security logic group. In one example, a security logic group can be a security association (SA) according to the IPsec protocol. An SA can include values such as a destination address, a security parameter index (SPI), the IPSec transforms (e.g., tunnel or transport mode) for a session, security keys, and additional attributes such as IPSec lifetime. An SA in each endpoint has a unique SPI value that is recorded in a Security Parameter Databases (SAD) maintained in, for instance, a dynamic random-access memory (DRAM) and contains parameter values for each SA. To dynamically establish an SA, the gateway scaler or the original instance of the VPN gateway can be configured to perform key exchange, identify an encryption algorithm, or negotiate a traffic selector with the on-premise gateway using the previously established control channel. In other embodiments, the gateway scaler can create other suitable types of security logic group in other suitable manners.

Upon completion of creating the security logic group, the gateway scaler can be configured to associate an outer flow of network traffic with the security logic group (e.g., an SA) by specifying in the LB that packets of outer flows containing certain flow parameters (e.g., a source address and a destination address from an IP header and a particular SPI of an SA in an encapsulating security payload (ESP) protocol header) is to be forwarded to a designated instance of the VPN gateway. In response, upon receiving packets from the on-premise gateway, the LB can inspect the packets for an SPI value in addition to a source address, a destination address, and a protocol value in the packet headers. The LB can then forward the incoming packets of a particular outer flow to a corresponding instance of the VPN gateway for further processing. As such, the LB can forward each unique outer flow to corresponding instances of the VPN gateway and ensures that a particular outer flow goes to only one instance. As such, traffic flow previously through the original instance of the VPN gateway can be partially distributed to the newly created one or more instances of the VPN gateway to reduce risks of processing/network congestion at the original instance.

As such, instances of the VPN gateway and data channels of the VPN tunnel between the on-premise gateway and the virtual network can be dynamically scaled to accommodate varying load requirements of communications between the on-premise network and the cloud computing system. In one aspect, creation of the security logic groups may not require any reconfiguration of the on-premise gateway. In the example above based on IPsec, establishing additional SAs can be dynamically performed via a control channel previously established between the on-premise gateway and the original instance. As such, reconfiguration of the on-premise gateway by an administrator may not be needed. In another aspect, while creating the new instances of the VPN gateway and the new data channels, the network traffic continues to flow through the original instance and data channel until the new data channels are established. As a result, packet loss during scaling of the instances of the VPN gateway may be avoided.

BRIEF DESCRIPTION OF THE DRAWINGS

FIG. 6 is a computing device suitable for certain components of the cloud computing system in FIG. 1.

DETAILED DESCRIPTION

Figure 1:
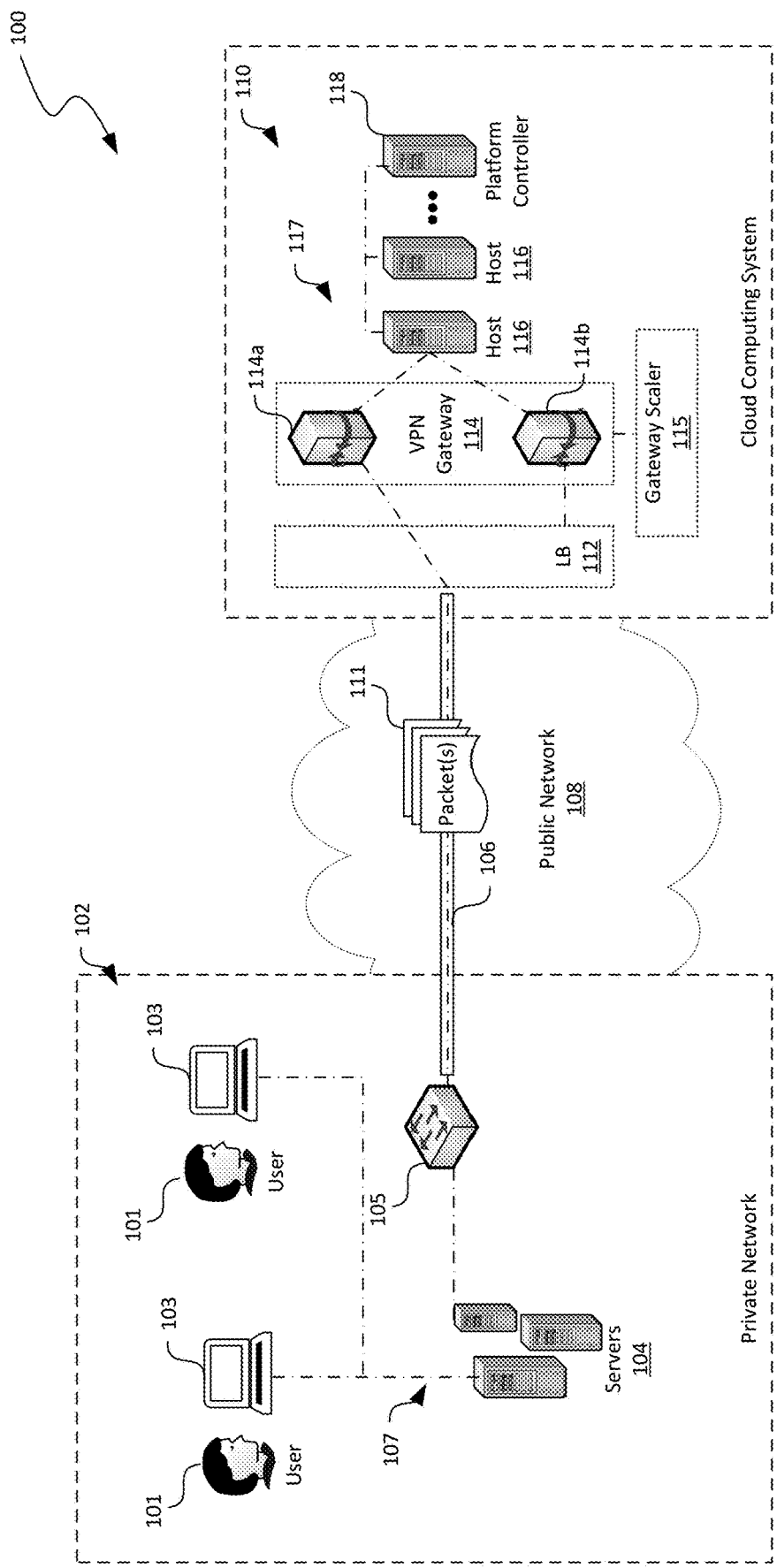
FIG. 1 is a schematic diagram illustrating a computing framework having a cloud computing system implementing dynamic VPN gateway scaling in accordance with embodiments of the disclosed technology.

Certain embodiments of systems, devices, components, modules, routines, data structures, and processes for dynamic VPN gateway scaling are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-6.

As used herein, a "cloud computing system" or a "cloud" generally refers to an interconnected computer network having a plurality of network devices that interconnect a plurality of servers or hosts to one another or to external networks (e.g., the Internet). At least some of the servers or hosts can be located in, for example, different datacenters at diverse geographical locations. A cloud can be public when accessible to the general public, or can be private when only accessible to members of an organization.

The term "network device" generally refers to a physical network device, examples of which include routers, switches, hubs, bridges, load balancers, security gateways, or firewalls. A "host" generally refers to a computing device configured to implement, for instance, one or more virtual machines or other suitable virtualized components. For example, a host can include a server having a hypervisor configured to support one or more virtual machines or other suitable types of virtual components. The one or more virtual machines can be used to execute suitable applications or computer programs to provide corresponding cloud services.

Also used herein, the term "cloud service" or "cloud computing service" generally refers to computing resources provided over a computer network such as the Internet. Common examples of cloud services include software as a service ("SaaS"), platform as a service ("PaaS"), and infrastructure as a service ("IaaS"). SaaS is a software distribution technique in which software applications are hosted by a cloud service provider in, for instance, datacenters, and accessed by users over a computer network. PaaS generally refers to delivery of operating systems and associated services over the computer network without requiring downloads or installation. IaaS generally refers to outsourcing equipment used to support storage, hardware, servers, network devices, or other components, all of which are made accessible over a computer network.

As used herein, a "packet" generally refers to a formatted unit of data carried by a packet-switched network. A packet typically can include user data along with control data. The control data can provide information for delivering the user data. For example, the control data can include source and destination network addresses/ports, error checking codes, sequencing information, hop counts, priority information, security information, or other suitable information regarding the user data. Typically, the control data can be contained in headers and/or trailers of a packet. The headers and trailers can include one or more data field containing suitable information. An example data schema for a packet is described in more detail below with reference to FIGS. 4A-4C.

A virtual private network (VPN) generally refers to a computer network established via encrypted connections over a public or shared network, such as the Internet or a computer network in a multi-tenant cloud computing system. VPNs can be accessed via "VPN gateways" configured to implement various communications and/or security protocols used for securing and encrypting transmitted data. Example protocols include IP security (IPsec), Secure Sockets Layer (SSL) and Transport Layer Security (TLS), Point-To-Point Tunneling Protocol (PPTP), Layer 2 Tunneling Protocol (L2TP), and OpenVPN. A VPN gateway can be configured to authenticate a VPN client (e.g., a remote user) or another VPN gateway using passwords, tokens, or other suitable credentials. Once authenticated, a VPN gateway can establish a "VPN connection" or "VPN tunnel" with a VPN client or another VPN gateway. A VPN tunnel generally refers to a secure network link between a VPN gateway and a VPN client or another VPN gateway.

VPNs are a low cost technique for allowing remote users or branch offices to be securely connected via a public network, such as the Internet. In one implementation, an organization can have (i) an on-premise private network, for example, a local area network (LAN) deployed in an office and (ii) a virtual network (VNET) hosted on a cloud computing system. To secure communications between the LAN and the VNET, the virtual network of the organization can deploy a VPN gateway to interface with, for example, a network router or "on-premise gateway" at the private network that is configured to implement IPsec or other suitable secure communications protocols. In operation, the on-premise gateway and the VPN gateway can send/receive encrypted network traffic across the public network as if the virtual network is directly connected to the on-premise private network.

The virtual network can typically deploy multiple instances of the same VPN gateway each with a corresponding public IP address for service availability or other reasons. As such, the on-premise gateway can create multiple VPN connections to the multiple instances of the VPN gateway. However, for each VPN connection, a single data channel is configured to carry and a corresponding instance of the VPN gateway is configured to process all network traffic through the VPN connection. Such reliance on the single data channel and instance of the VPN gateway may create communications bottlenecks. For example, a processor load on a host hosting the instance of the VPN gateway may be excessive when a number of packets transmitted through the VPN connection becomes large. Such processor overload can create high network latencies, and negatively impact user experience when accessing cloud resources at the cloud computing system.

Several embodiments of the disclosed technology can address certain aspects of the foregoing difficulties by implementing a gateway scaler configured to scale a number of instances of the VPN gateway as network traffic carried by the VPN connection increases. In one implantation, the gateway scaler can be configured to determine a rate of transmission/reception of packets (referred to as "inner flows") between pairs of computers at the on-premise network and virtual machines at the virtual network (referred to as "peers" or "endpoints"), a number of inner flows, or a longevity value of one or more inner flows. When, for example, a rate, a number of the inner flows, or a longevity of an inner flow exceeds a preset threshold, the gateway scaler can differentiate one or more inner flows from the other inner flows by dynamically establishing a new security logic group, such as an SA according to the IPsec protocol. Once established, a load balancer (LB) at the cloud computing system can be configured to inspect incoming packets for an SPI corresponding to the SA and forward the packets belonging to the SA (referred to as "outer flows") to a corresponding instance of the VPN gateway for further processing. VPN connections between the on-premise gateway and the virtual network can thus be dynamically scaled to accommodate varying load requirements from the on-premise network, as described in more detail below with reference to FIGS. 1-6.

FIG. 1 is a schematic diagram illustrating a computing framework 100 having a cloud computing system 110 implementing dynamic VPN gateway scaling in accordance with embodiments of the disclosed technology. As shown in FIG. 1, the computing framework 100 can include a private network 102 interconnected to a cloud computing system 110 via a public network 108. The public network 108 can include the Internet or other suitable types of a shared computer network. Even though only one private network 102 is shown in FIG. 1, in other embodiments, multiple private networks 102 (not shown) can be interconnected to the same cloud computing system 110.

As shown in FIG. 1, the private network 102 can be an on-premise network that includes a local area network 107 interconnecting one or more endpoints such as servers 104 and client devices 103. The servers 104 can be individually configured to execute suitable instructions to provide functionality for the client devices 103. For example, the servers 104 can be configured to provide a file management system, an electronic mail exchange, or other suitable computing services. The local area network 107 can include multiple routers, switches, firewalls, or other suitable network devices (not shown) interconnecting the servers 104 and the client device 103 via wired or wireless communications media.

The client devices 103 can each include a computing device that facilitates corresponding users 101 to access the servers 104 and various cloud services provided by the cloud computing system 110. In the illustrated embodiment, the client devices 103 individually include a desktop computer. In other embodiments, the client devices 103 can also include laptop computers, tablet computers, smartphones, or other suitable computing devices. Even though two users 101 and corresponding client devices 103 are shown in FIG. 1 for illustration purposes, in other embodiments, the cloud computing system 110 can facilitate any suitable numbers of users 101.

As shown in FIG. 1, the private network 102 can also include an on-premise gateway 105 configured to interface with the cloud computing system 110 via one or more VPN connection 106. In certain embodiments, the on-premise gateway 105 can be configured to implement a suitable secure communications protocol. In one example, the on-premise gateway 105 can include a router configured to implement IPsec protocol to provide data confidentiality, data integrity, and data authentication between the on-premise gateway 105 and one or more instances 114a and 114b of a VPN gateway 114 via VPN connection 106, as described in more detail below. In other examples, the on-premise gateway 105 can also include a switch, a server, or other suitable components configured to implement additional and/or different secure communications protocols.

Also shown in FIG. 1, the cloud computing system 110 can include one or more hosts 116, a platform controller 118, first and second instances 114a and 114b of a VPN gateway 114, and a load balancer 112 (shown in FIG. 1 as "LB 122") operatively coupled by a cloud network 117. In certain embodiments, the hosts 106 can individually include a physical server or a computing blade having several physical servers individually having one or more non-volatile data storage device, computer memories, network interface cards, and/or other suitable computing components. In other embodiments, the hosts 106 can also include one or more physical servers with multiple processor cores, or other suitable types of computing devices. Though not shown in FIG. 1, the hosts 106 can be organized into racks, availability zones, groups, sets, computing clusters, or other suitable divisions. Even though two hosts 116 are shown in FIG. 1 for illustration purposes, in other embodiments, the cloud computing system 110 can include any suitable numbers of hosts 106 and/or other suitable types of components. The hosts 106 can be individually configured to host one or more virtual machines 144 (shown in FIG. 2) or other suitable software components, as described in more detail with reference to FIG. 2.

The platform controller 118 can include a fabric controller, a datacenter controller, application delivery controller, or other suitable types of controller configured to monitor status and manage operations of the hosts 106 in the cloud computing system 110. For example, the platform controller 118 can monitor whether a host 106 or components thereof has failed. In response to detecting a failure of the host 106 or components thereof, the platform controller 118 can attempt to remedy the detected failure by, for instance, migrating virtual machines hosted on the failed host 106 to other hosts 106, restarting the failed host 106, replacing hardware components of the failed host 106, and/or perform other suitable operations. Though the platform controller 118 are shown as separate physical servers in FIG. 1, in other embodiments, the platform controller 118 can also include computing services provided by one or more of the hosts 106 in the cloud computing system 110.

The load balancer 112 can be configured to distribute network traffic received from the private network 102 across the multiple instances 114a and 114b of the VPN gateway 114. In certain embodiments, the load balancer 112 can include a standalone hardware load balancer. In other embodiments, the load balancer 112 can include a software load balancer hosted on, for instance, one of the hosts 116. The load balancer 112 can be configured to continuously or periodically probe a health status of the instances 114a and 114b by, for example, transmitting health probe messages and monitoring responses from the transmitted health probe messages. Upon determining that one or more of the instances 114a and 114b are healthy, the load balancer 112 can forward network traffic from the on-premise gateway 105 to the first and second instances 114a or 114b based on, for example, a source address, destination address, and a digital identifier of a security logic group (e.g., an SPI), as described in more detail below with reference to FIGS. 3A and 3B.

The VPN gateway 114 can be configured to interface with the on-premise gateway 105 via one or more VPN connections 106 (only one is shown for illustration purposes) via the public network 108. The VPN gateway 114 can implement various communications/security protocols used for securing and encrypting transmitted data between the on-premise gateway 105 at the private network 102 and a virtual network 146 (shown in FIG. 2) at the cloud computing system 110. As shown in FIG. 1, the VPN gateway 114 include first and second instances 114a and 114b each having a corresponding network address (e.g., an IP address) suitable for routing network traffic from the on-premise gateway 105 to the first or second instance 114a or 114b via the public network 108. In other embodiments, the VPN gateway 114 can include three, four, or any suitable number of instances (not shown).

As shown in FIG. 1, the on-premise gateway 105 is connected to the first instance 114a via the VPN connection 116 to transmit/receive network traffic from the virtual network 146 at the cloud computing system 110. For example, both client devices 103 can transmit/receive data to corresponding virtual machines 144 at the cloud computing system 100. Upon receiving such data, the on-premise gateway can apply corresponding security processing (e.g., encapsulation, encryption, etc.) to the data before sending the secured data as packets 111 to the cloud computing system 110 via the VPN connection 106. Upon receiving the packets 111, the load balancer 112 can inspect the packets 111 for one or more of a source address, destination address, and a protocol value used for the packets 111. Using such parameters and/or other suitable parameters of the packets 111, the load balancer 112 can identify the received packets 111 as belonging to one or more outer flows and forward the packets 111 of certain outer flows to a suitable corresponding destination, for instance, the first VPN instance 114a or the second VPN instance 114b.

The foregoing operations, however, may experience certain difficulties when one or more of the client devices 103 are transmitting/receiving a large amount of data. For example, as shown in FIG. 1, all network traffic between the on-premise gateway 105 and the cloud computing system 110 is carried by the VPN connection 106 and processed by the first instance 114a of the VPN gateway. As such, the large amount of data transmitted/received from the client device 103 may cause a host 105 hosting the first instance 114a to experience processing overload. In addition, a single data channel is typically used to carry all network traffic between the private network 102 and the cloud computing system 110 via the VPN connection 106. As such, network traffic between the private network 102 and the cloud computing system 110 may experience unacceptable network latency.

As shown in FIG. 1, several embodiments of the disclosed technology can address the foregoing difficulties by implementing a gateway scaler 115 configured to dynamically scale instances of the VPN gateway 114 between the private network 102 and the cloud computing system 100. In certain implementations, the gateway scaler 115 can be configured to distribute a part of the network traffic from the first instance 114a to the second instance 114b. As such, a processing and/or network load placed on the first instance 114a can be reduced to reduce risks of significant network delays, as described in more detail below with reference to FIGS. 3A-6.

Figure 2:
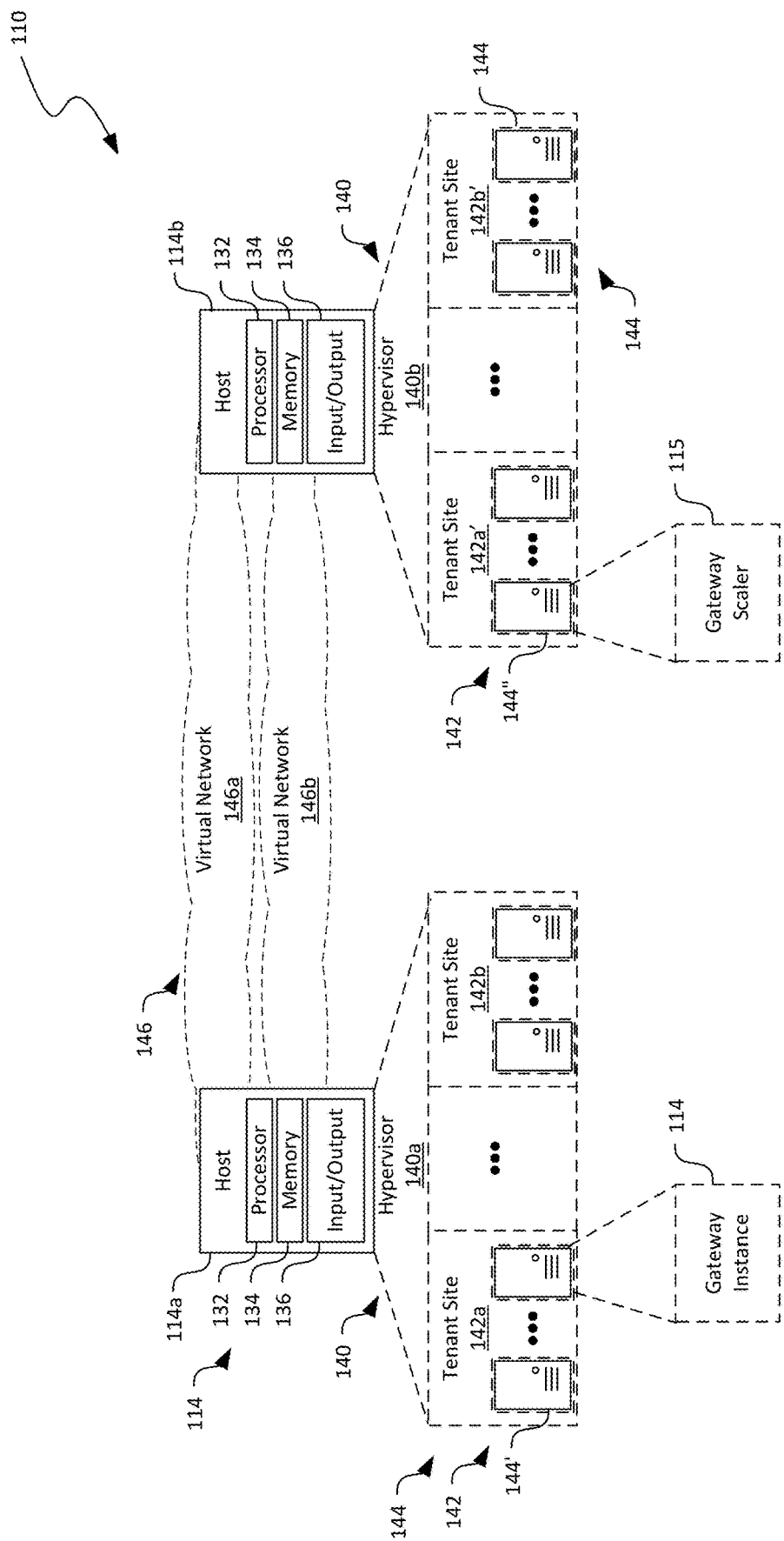
FIG. 2 is a schematic diagram illustrating certain hardware/software components of the cloud computing system of FIG. 1 in accordance with embodiments of the disclosed technology.

FIG. 2 is a schematic diagram illustrating certain hardware/software components of the cloud computing system 110 of FIG. 1 in accordance with embodiments of the disclosed technology. In FIG. 2, only certain components of the cloud computing system 110 of FIG. 1 are shown for clarity. In other examples, the cloud computing system 110 can include additional and/or different components as shown in FIG. 2.

As shown in FIG. 2, the first host 106a and the second host 106b can each include a processor 132, a memory 134, and an input/output component 136 operatively coupled to one another. The processor 132 can include a microprocessor, a field-programmable gate array, and/or other suitable logic devices. The memory 134 can include volatile and/or nonvolatile media (e.g., ROM; RAM, magnetic disk storage media; optical storage media; flash memory devices, and/or other suitable storage media) and/or other types of computer-readable storage media configured to store data received from, as well as instructions for, the processor 132 (e.g., instructions for performing the methods discussed herein). The input/output component 136 can include a network interface card or other suitable types of input/output devices configured to accept input from and provide output to an operator and/or an automated software controller (not shown).

The memory 134 of the first and second hosts 106a and 106b can include instructions executable by the corresponding processors 132 to cause the individual hosts 106 to provide a hypervisor 140 (identified individually as first and second hypervisors 140a and 140b) and other suitable virtual components such as virtual network interface card, virtual switches, etc. (not shown). The hypervisors 140 can individually be configured to initiate, monitor, terminate, and/or otherwise locally manage one or more virtual machines 144 organized into tenant sites 142. For example, as shown in FIG. 2, the first host 106a can provide a first hypervisor 140a that manages first and second tenant sites 142a and 142b, respectively, for the same or different tenants or users 101 (FIG. 1). The second host 106b can provide a second hypervisor 140b that manages first and second tenant sites 142a' and 142b', respectively.

The hypervisors 140 can be software, firmware, or hardware components. The tenant sites 142 can each include multiple virtual machines 144 or other suitable tenant instances for a tenant. For example, the first host 106a and the second host 106b can both host the tenant site 142a and 142a' for a first user 101a. The first host 106a and the second host 106b can both host the tenant site 142b and 142b' for a second user 101b (FIG. 1). Each virtual machine 144 can be executing a corresponding operating system, middleware, and/or applications. For example, as shown in FIG. 2, the virtual machine 144 of the first host 106a can be configured to execute suitable instructions to provide an instance of a VPN gateway 114 while the virtual machine 144 of the second host 106b can be configured to execute suitable instructions to provide the gateway scaler 115. In other examples, a container (e.g., a Docker) hosted on the individual hosts 106 can also be configured to provide the instance of the VPN gateway 114 and/or the gateway scaler 115.

Also shown in FIG. 2, the cloud computing system 110 can include one or more virtual networks 146 that interconnect the tenant sites 142a and 142b across multiple hosts 106. For example, a first virtual network 146a interconnects the first tenant sites 142a and 142a' at the first host 106a and the second host 106b. A second virtual network 146b interconnects the second tenant sites 142b and 142b' at the first host 106a and the second host 106b. Even though a single virtual network 146 is shown as corresponding to one tenant site 142, in other embodiments, multiple virtual networks 146 (not shown) may be configured to correspond to a single tenant site 146.

The virtual machines 144 on the virtual networks 146 can communicate with one another even though the virtual machines 144 are located on different hosts 106. Communications of each of the virtual networks 146 can be isolated from other virtual networks 146. In certain embodiments, communications can be allowed to cross from one virtual network 146 to another through a security gateway or otherwise in a controlled fashion. A virtual network address can correspond to one of the virtual machine 144 in a virtual network 146. Thus, different virtual networks 146 can use one or more virtual network addresses that are the same. Example virtual network addresses can include IP addresses, MAC addresses, and/or other suitable addresses.

Figure 3A:
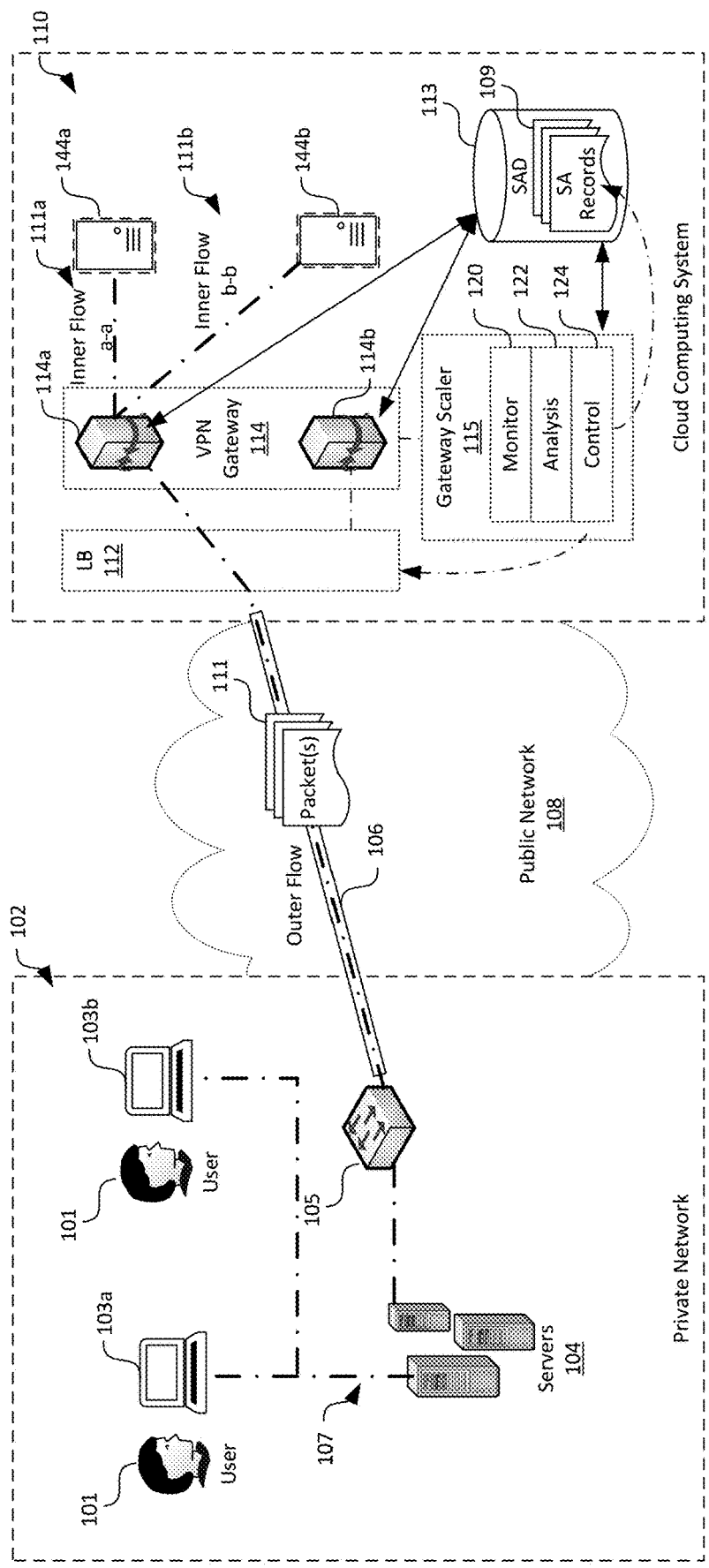
FIGS. 3A and 3B are schematic diagrams illustrating certain components of the computing framework in FIG. 1 during certain stages of operation in accordance with embodiments of the disclosed technology.
Figure 3B:
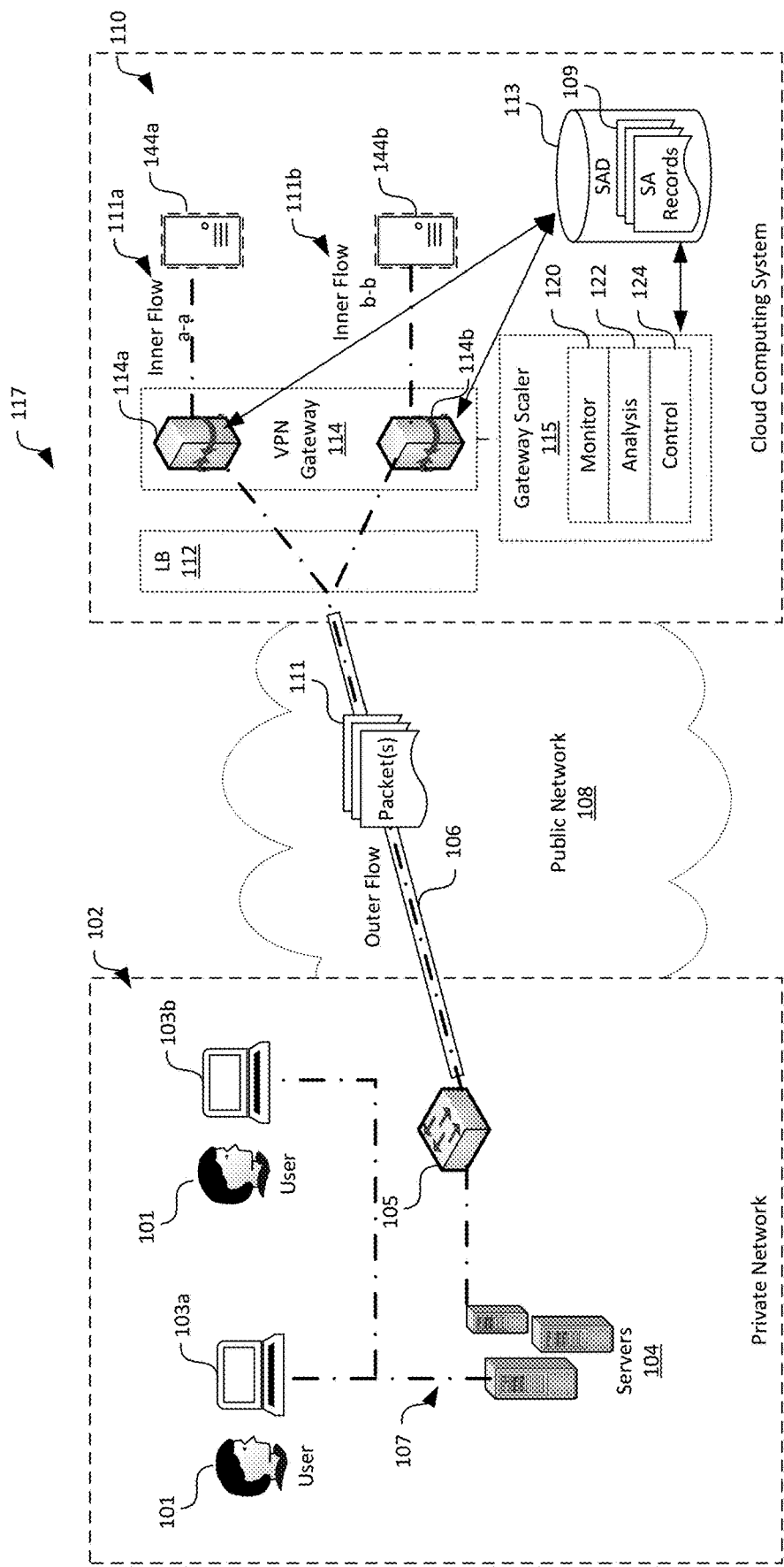

FIGS. 3A and 3B are schematic diagrams illustrating certain components of the computing framework 100 in FIG. 1 during certain stages of operation in accordance with embodiments of the disclosed technology. In the example shown in FIG. 3A, a first client device 103a is illustrated as communicating with a first virtual machine 144a via a first inner flow 111a identified in FIG. 3A as "Flow a-a" while a second client device 103b is communicating with a second virtual machine 144b via a second inner flow 111b identified in FIG. 3A as "Flow b-b". The "flows" generally refers to network traffic between pairs of the client devices 103 and corresponding virtual machines 144 and can include a stream of packets identified by, for example, a source IP address, a destination IP address, a protocol value, or other suitable parameters of the packets. As described in more detail later, one or more of the inner flows can also be included as an at least partially encrypted payload in the packets 111 belonging to one or more outer flows transmitted via the public network 108. The outer flows can be identified by, at least in part, a digital identifier (e.g., an SPI) of a security logic group (e.g., an SA) according to which the packets 111 are to be processed.

As shown in FIG. 3A, each of the first and second instances 114a and 114b can be configured to implement various secure communications protocols such as IPsec and facilitate establishing, maintaining, as well as facilitating data transfer to/from the on-premise gateway 105 via the VPN connection 106. For example, the first and second instances 114a and 114b can each include an authentication routine (not shown) for authenticating connection requests, encapsulation/decapsulation routine (not shown) for manipulating packets 111 transmitted via the VPN connection 106, and encryption/decryption routines (not shown) for encrypting/decrypting content of the received/transmitted packets 111. Even though aspects of the disclosed technology are described below using an existing instance of the VPN gateway 114 (i.e., the second instance 114b), in other embodiments, the second instance 114b may be created by, for example, the gateway scaler 115 in response to determining that the first instance 114a is overloaded.

The gateway scaler 115 can be configured to monitor one or more operating parameters of the VPN gateway 114 and scale instances of the VPN gateway 114 in response to detecting that existing instances of the VPN gateway 114 are overloaded. As shown in FIG. 3A, the gateway scaler 115 can include a monitor component 120, an analysis component 122, and a control component 124 operatively coupled to one another. Though particular components of the gateway scaler 115 are shown in FIG. 3A for illustration purposes, in other embodiments, the gateway scaler 115 can also include input/output or other suitable types of component.

The monitor component 120 can be configured to monitor one or more operating parameters of the first and/or second instance 114a and 114b of the VPN gateway 114. For example, the monitor component 120 can be configured to monitor a network bandwidth consumed, a number of packets 111 sent/received in a preset period, a processor load on a host 106 (FIG. 1) hosting the first and/or second instance 114a and 114b of the VPN gateway 114, or other suitable parameters. In a particular example implementation, the monitor component 120 can include a packet counter configured to count a number of packets 111 transmitted/received over a period of time between the private network 102 and the cloud computing system 110. In other examples, the monitor component 120 can also be configured to monitor operating parameters of the inner flows. For instance, the monitor component 120 can be configured to monitor a number of the inner flows, a bandwidth consumption by each inner flow, a longevity value of each inner flow between each pair of the client devices 103 and the corresponding virtual machines 144 after decapsulation/decryption of the packets 111 of the outer flow by the first instance 114a. The monitor component 120 can then forward the obtained operating parameters to the analysis component 122 for further processing.

The analysis component 122 can be configured to determine whether the first instance 144a is experiencing a processing overload based on the operating parameters received from the monitor component 120. For example, in one implementation, the analysis component 122 can include a comparison module configured to compare a total number of packets 111 transmitted/received over a period of time for all outer flows through the first instance 114a with a preset threshold. In response to determining that the total number of packets 111 exceeds the threshold, the analysis component 122 can indicate that the first instance 114a is overloaded. In another implementation, the analysis component 122 can also include a comparison module configured to compare a number of inner flows, a bandwidth consumption of each inner flows, or a longevity value of each inner flows with another preset threshold. In response to determining that the foregoing parameters of the inner flows exceed a corresponding threshold, the analysis component 122 can indicate that the first instance 114a is overloaded. In further implementations, the analysis component 122 can also be configured to determine whether the first instance 114a is overloaded based on a moving average or other suitable derived values of the operating parameters.

Upon determining that the first instance 114a is overloaded, the analysis component 122 can indicate accordingly to the control component 124 for dynamically scale the VPN connection 106. In accordance with embodiments of the disclosed technology, the control component 124 can be configured to create new data channels by, for example, establishing additional security logic groups for the inner flows in response to receiving the indication that the first instance 114a is overloaded. In the following description, terminologies according to IPsec protocol are used for illustrating aspects and concepts of the disclosed technology though similar techniques may also be implemented according to other suitable secure communication protocols. For instance, an example security logic group can be a security association (SA) according to the IPsec protocol.

As shown in FIG. 3A, the gateway scaler 115 can be operatively coupled to an SA database 113 (shown in FIG. 3A as "SAD 113") containing one or more SA records 109. Each SA record 109 can contain data representing values of a destination address, a security parameter index (SPI) unique to each SA, the IPSec transforms (e.g., tunnel or transport mode) for a session, security keys, a traffic selector identifying one or more inner flows, and additional attributes such as IPSec lifetime. Example SPI values can include a 32-bit number uniquely identifying a corresponding SA. As shown in FIG. 3A, the SA records 109 are accessible to all instances (e.g., first and second instances 114a and 114b) of the VPN gateway 114.

The control component 124 can negotiate with or cause the first or second instance 114a or 114b to negotiate with the on-premise gateway 115 to establish one or more new SAs via an existing control channel (e.g., IKE SA) in response to receiving an indication that the first instance 114a is overloaded. Example negotiation operations can include negotiating a shared IPSec policy, deriving shared secret keying material used for the IPSec security algorithms, negotiating a suitable value (e.g., one or more inner flow identifiers) of a traffic selector, and establishing the IPSec SA. Once the new SA is created, a new SA record 109 for the created SA can be stored in the SAD 113. For instance, in the illustrated example in FIG. 3A, the second inner flow 111b identified as "Flow b-b" between the second client device 103b and the second virtual machine 144b may have exceeded the present threshold. In response, the control component 124 can create a new SA and corresponding SA record 109 for the second inner flow 111b. In other examples, the control component 124 can also create one or more SA records 109 for the first inner flow 111a or additional flows (not shown).

During creation of the new SA, the network traffic corresponding to the second inner flow 111b can still be processed by the first instance 114a. For example, as shown in FIG. 3A, a packet 111 associated with the second inner flow 111b can be received at the load balancer 112. According to one or more of a source address, destination address, or protocol value of an outer header of the packet 111, the load balancer 112 can forward the packet 111 to the first instance 114a for further processing. Upon decapsulation/decryption, the first instance 114a can determine that the packet 111 belongs to the second inner flow 111b and is destined to the second virtual machine 144b by, for example, inspecting a destination address of an inner header of the packet 111. The first instance 114a can then forwards the packet 111 to the second virtual machine 144b according to the destination address of the inner header of the packet 111. As such, loss of packets 111 of the second inner flow 111b during creation of the new SA can be avoided.

Once the new SA has been established, the control component 124 can instruct the load balancer 112 to distribute a part of the network traffic to, for instance, the second instance 114b by reconfiguring a load balancing policy at the load balancer 112. In one embodiment, the control component 124 can create or modify a load balancing policy that causes the load balancer 112 to forward a packet 111 to one of the first or second instance 114a or 114b based on a combination of a source address, destination address, or protocol value of an outer header and an SPI of an ESP header. For example, one load balancing policy can indicate that a packet 111 having a source address corresponding to the first client device 103a, a destination address corresponding to the first virtual machine 144a, a protocol value of ESP (e.g., "50"), and an SPI corresponding to a first SA is to be forwarded to the first instance 114a. Another load balancing policy can indicate that a packet 111 having a source address corresponding to the second client device 103b, a destination address corresponding to the second virtual machine 144b, a protocol value of ESP (e.g., "50"), and an SPI corresponding to a second SA is to be forwarded to the second instance 114a. In other embodiments, distribution by the load balancer 112 can be modified in other suitable manners.

In operation, the load balancer 112 can thus forward packets 111 received from the private network 102 to one of the first or second instance 114a or 114b to dynamically scale a number of instances of the VPN gateway 114. For example, as shown in FIG. 3B, upon receiving a packet 111 from the private network 102 that is destined from the first client device 103a to the first virtual machine 144a, the load balancer 112 can forward the packet 111 to the first instance 114a based on a first SPI corresponding to a first SA. Upon receiving another packet 111 destined from the second client device 103b to the second virtual machine 144b, the load balancer 112 can forward the packet 111 to the second instance 114b based on a second SPI corresponding to a second SA. As a result, a processing load on the first instance 114a can be reduced in order to reduce risks of excessive processing delays at the first instance 114a of the VPN gateway 114.

Figure 4A:
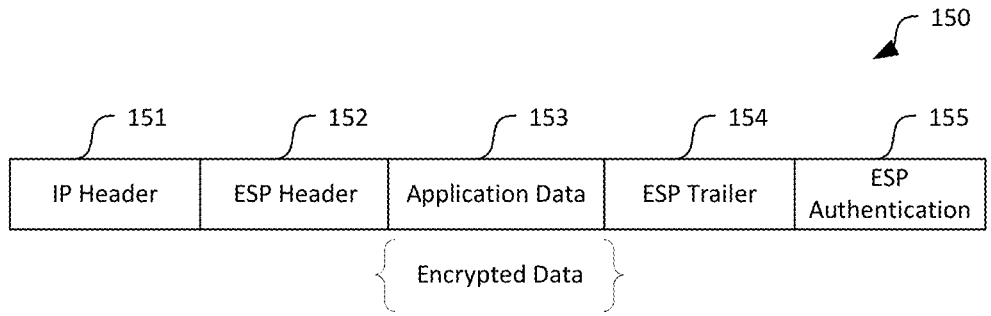
FIGS. 4A-4C are schematic diagrams illustrating example data schema suitable for a packet in accordance with embodiments of the disclosed technology.
Figure 4B:
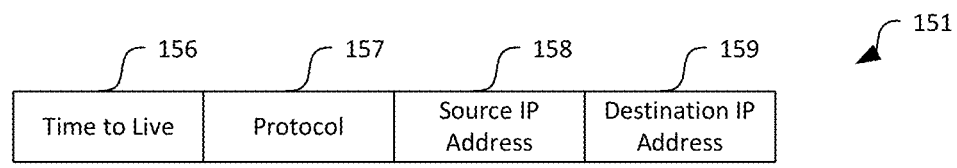
Figure 4C:
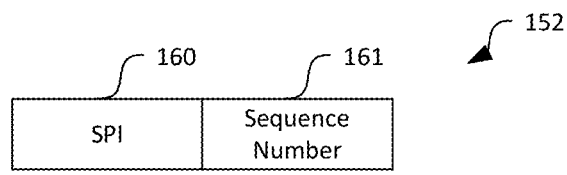

FIGS. 4A-4C are schematic diagrams illustrating example data schema 150 suitable for a packet 111 in FIGS. 3A and 3B in accordance with embodiments of the disclosed technology. As shown in FIG. 4A, the data schema 150 can include an IP header 151, an ESP header 152, an application data field 153, an ESP trailer, and an ESP authentication trailer 155 arranged in sequence. The IP header 151 can include various fields containing parameters of control data for routing a packet from a source (e.g., the on-premise gateway 105 in FIG. 1) to a destination (e.g., the load balancer 112 in FIG. 1) via the public network 108 (FIG. 1). Example data fields of the IP header 151 are described in more detail below with reference to FIG. 4B.

Referring to FIG. 4C, the ESP header 152 can include an SPI field 160 and a sequence number field 161. The SPI field 160 can contain an SPI value corresponding to a unique SA, as described above with reference to FIGS. 3A and 3B. An example SPI value can be "0x267BC43." The sequence number field 161 can contain a sequence value incremented for each packet. The sequence value can be unique to each SA.

Referring back to FIG. 4A, the application data field 153 can contain encrypted data of one or more additional headers (e.g., TCP, UDP headers) and application data carried by the packet. The ESP trailer 154 can contain padding data used for cryptography alignment as well as a next header field containing an identifier of a nature of a payload, e.g., TCP or UDP. The ESP authentication trailer 155 can contain an integrity check value and a message authentication code used for verify a sender's identity and message integrity.

As shown in FIG. 4B, the IP header 151 can include a time to live field 156, a protocol field 157, a source IP address field 158, and a destination IP address field 158. The time to live field 156 can contain a time within which the packet is active. The protocol field 157 can contain a value (e.g., an integer) corresponding to a protocol used for encoding a payload of the packet. For example, the protocol field 157 can contain "50" indicating that the packet is encoded according to encapsulating security payload (ESP) protocol. The source and destination IP address fields 158 and 159 can contain suitable network addresses (e.g., in IPv4 or IPv6) of a source and a destination from/to which the packet is generated/transmitted.

Figure 5A:
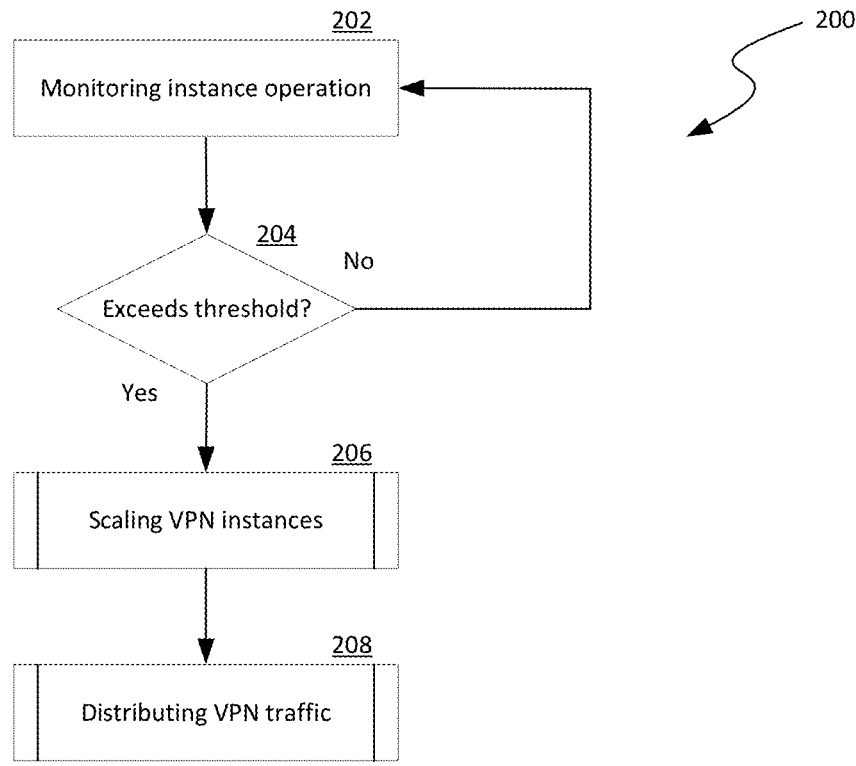
FIGS. 5A-5C are flowcharts illustrating certain processes of dynamic VPN gateway scaling in accordance with embodiments of the disclosed technology.
Figure 5B:
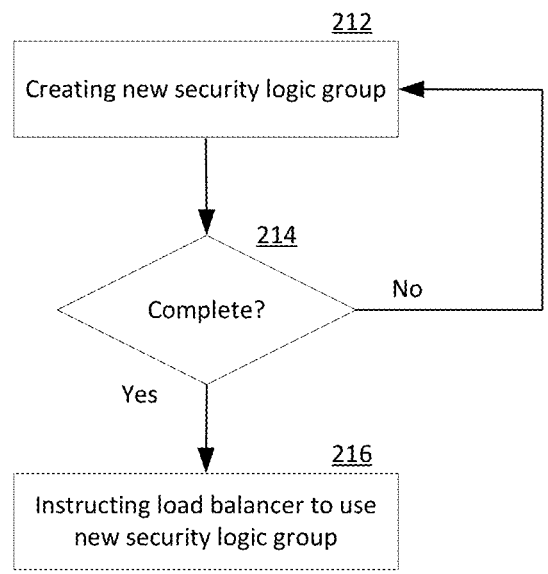
Figure 5C:
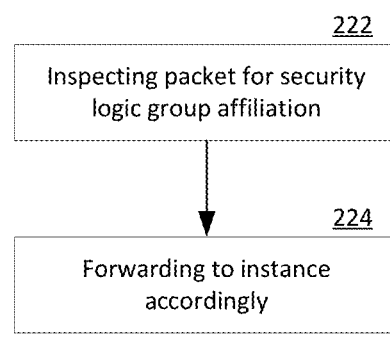

FIGS. 5A-5C are flowcharts illustrating certain processes of dynamic VPN gateway scaling in accordance with embodiments of the disclosed technology. As shown in FIG. 5A, a process 200 can include monitoring operations of an instance of a VPN gateway at stage 202. Various example operational parameters can be monitored, as described above with reference to FIGS. 3A and 3B. In one example implementation, the operational parameter can include a packet count over a period for a particular flow processed by the instance. The process 200 can then include a decision stage 204 to determine whether the monitored one or more operational parameters exceed a corresponding threshold. In response to determining that the monitored operational parameter exceeds the threshold, the process 200 can include scaling the VPN connection to another instance at stage 206. Example operations for scaling the VPN connection are described below in more detail with reference to FIG. 5B. The process 200 can then include distributing VPN traffic to additional instances at stage 208. Example operations for distributing the VPN traffic are described below in more detail with reference to FIG. 5C.

As shown in FIG. 5B, operations of scaling VPN connection can include creating a new security logic group for one or more flows handled by the current instance at stage 212. Example operations for creating the security logic group are described above in the context of IPsec protocol with reference to FIGS. 3A and 3B. The operations can then include a decision stage 214 to determine whether the security logic group has been created. In response to determining that the security logic group has been created, the operations can include instructing a load balancer to use the new security logic group for distributing incoming packets at stage 216.

As shown in FIG. 5C, in response to receiving the instruction to use the new security logic group for distributing incoming packets, a load balancer can perform operations that include inspecting an incoming packet for security logic group affiliation at stage 222. In one example, security logic group affiliation is identified by an SPI value included in an ESP header of the packet, as described above with reference to FIGS. 3A and 3B. In other examples, the security logic group affiliation can be identified in other suitable manners. The operations can then include forwarding the incoming packet to a corresponding instance of the VPN gateway according to the security logic group affiliation (e.g., SPI) at stage 224.

FIG. 6 is a computing device 300 suitable for certain components of the computing framework 100 in FIG. 1. For example, the computing device 300 can be suitable for the client devices 102, hosts 106, or the load balancer 112 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (μP), a microcontroller (μC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 10 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

Specific embodiments of the technology have been described above for purposes of illustration. However, various modifications can be made without deviating from the foregoing disclosure. In addition, many of the elements of one embodiment can be combined with other embodiments in addition to or in lieu of the elements of the other embodiments. Accordingly, the technology is not limited except as by the appended claims.

We claim:

1. A computing device hosting a virtual private network (VPN) gateway having multiple instances for facilitating VPN network traffic between a private network and a cloud computing system, the computing device comprising:
   a processor; and
   a memory containing instructions executable by the processor to cause the computing device to:
      determine whether a number of packets processed by a first instance of the VPN gateway exceeds a preset threshold, the first instance being connected to an on-premise gateway of the private network via a load balancer and a VPN connection through a public network; and in response to determining that the number of packets processed by the first instance of the VPN gateway exceeds the preset threshold, create a security association (SA) corresponding to a portion of the VPN network traffic currently processed by the first instance, the created SA including one or more security parameters configured to allow secure communications between one or more endpoints in the private network and one or more corresponding endpoints in the cloud computing system; and upon completion of creating the SA, instruct the load balancer to forward the portion of the network traffic to a second instance of the VPN gateway when a security parameter index (SPI) of the created SA is contained in additional incoming packets.

2. The computing device of claim 1 wherein the memory contains additional instructions executable by the processor to cause the computing device to:

prior to instructing the load balancer to forward the portion of the network traffic to the second instance, maintain a load balancing policy in the load balancer such that the portion of the network traffic is forwarded to the first instance for processing.

3. The computing device of claim 1 wherein to create the SA includes:

to negotiate with the on-premise gateway for one or more of an encryption algorithm or an encryption key for the SA.

4. The computing device of claim 1 wherein:

the private network includes a first private endpoint corresponding to a first cloud endpoint and a second private endpoint corresponding to a second cloud endpoint at the cloud computing system; and to determine whether the number of packets processed by the first instance of the VPN gateway exceeds the preset threshold includes:

determine whether a first number of packets exchanged between the first private endpoint and the first cloud endpoint exceeds the preset threshold;

determine whether a second number of packets exchanged between the second private endpoint and the second cloud endpoint exceeds the preset threshold; and indicate that the first instance is overloaded when the first number or second number exceeds the preset threshold.

5. The computing device of claim 1 wherein:

the private network includes a first private endpoint corresponding to a first cloud endpoint and a second private endpoint corresponding to a second cloud endpoint at the cloud computing system; and to determine whether the number of packets processed by the first instance of the VPN gateway exceeds the preset threshold includes:

determine whether a total number of packets exchanged between the first private endpoint and the first cloud endpoint exceeds the preset threshold and between the second private endpoint and the second cloud endpoint exceeds the preset threshold; and indicate that the first instance is overloaded when the total number or second number exceeds the preset threshold.

6. The computing device of claim 1 wherein:

the private network includes a first private endpoint corresponding to a first cloud endpoint and a second private endpoint corresponding to a second cloud endpoint at the cloud computing system; and to determine whether the number of packets processed by the first instance of the VPN gateway exceeds the preset threshold includes:

determine whether a first number of packets exchanged between the first private endpoint and the first cloud endpoint exceeds the preset threshold;

determine whether a second number of packets exchanged between the second private endpoint and the second cloud endpoint exceeds the preset threshold; and to create the security association includes to create the SA for additional network traffic exchanged between the first private endpoint and the first cloud endpoint when the first number exceeds the preset threshold.

7. The computing device of claim 1 wherein:

the private network includes a first private endpoint corresponding to a first cloud endpoint and a second private endpoint corresponding to a second cloud endpoint at the cloud computing system; and to determine whether the number of packets processed by the first instance of the VPN gateway exceeds the preset threshold includes:

determine whether a first number of packets exchanged between the first private endpoint and the first cloud endpoint exceeds the preset threshold;

determine whether a second number of packets exchanged between the second private endpoint and the second cloud endpoint exceeds the preset threshold; and to create the security association includes:

to create the SA for additional network traffic exchanged between the first private endpoint and the first cloud endpoint when the first number exceeds the preset threshold; and to associate other additional network traffic exchanged between the second private endpoint and the second cloud endpoint with another SA different than the created SA.

8. A method for dynamically scaling a virtual private network (VPN) gateway having multiple instances for facilitating VPN network traffic between a private network and a cloud computing system, the method comprising:

determining whether a number of packets processed by a first instance of the VPN gateway exceeds a preset threshold, the first instance being connected to an on-premise gateway of the private network via a load balancer and a VPN connection through a public network; and in response to determining that the number of packets processed by the first instance of the VPN gateway exceeds the preset threshold, creating a security association (SA) corresponding to a portion of the VPN network traffic currently processed by the first instance, the created SA including one or more security parameters configured to allow secure communications between one or more endpoints in the private network and one or more corresponding endpoints in the cloud computing system; and upon completion of creating the SA, modifying a load balancing policy at the load balancer to forward the portion of the network traffic to a second instance of the VPN gateway when a security parameter index (SPI) of the created SA is contained in another incoming packet.

9. The method of claim 8 wherein:
the private network includes a first private endpoint corresponding to a first cloud endpoint and a second private endpoint corresponding to a second cloud endpoint at the cloud computing system; and
determining whether the number of packets processed by the first instance of the VPN gateway exceeds the preset threshold includes:
determining whether a first number of packets exchanged between the first private endpoint and the first cloud endpoint exceeds the preset threshold;
determining whether a second number of packets exchanged between the second private endpoint and the second cloud endpoint exceeds the preset threshold; and
creating the security association includes:
creating the SA for additional network traffic exchanged between the first private endpoint and the first cloud endpoint when the first number exceeds the preset threshold; and
associating other additional network traffic exchanged between the second private endpoint and the second cloud endpoint with another SA different than the created SA.

10. The method of claim 8, further comprising prior to instructing the load balancer to forward the portion of the network traffic to the second instance, maintain a load balancing policy in the load balancer such that the portion of the network traffic is forwarded to the first instance for processing.

11. The method of claim 8 wherein creating the SA includes negotiating with the on-premise gateway for one or more of an encryption algorithm or an encryption key for the SA.

12. A method for dynamically scaling a virtual private network (VPN) gateway having multiple instances for facilitating VPN network traffic between a private network and a cloud computing system, the method comprising:
determining whether a first instance of the VPN gateway is overloaded for processing incoming packets from the private network based on a preset threshold, the first instance being connected to an on-premise gateway of the private network via a VPN connection through a public network; and
in response to determining that the first instance is overloaded,
creating a security logic group corresponding to a portion of the VPN network traffic between the private network and the cloud computing system, the created security logic group including one or more security parameters configured to allow secure communications between a first endpoint in the private network and a second endpoint in the cloud computing system; and
upon completion of creating the security logic group, forwarding the portion of the network traffic to a second instance of the VPN gateway when a digital identifier of the created security logic group is a part of each of additional incoming packets.

13. The method of claim 12 wherein determining whether the first instance of the VPN gateway is overloaded includes:
monitoring a packet count between the first endpoint and the second endpoint;
determining whether the packet count exceeds a preset threshold; and
in response to determining that the packet count exceeds the preset threshold, indicating that the first instance of the VPN gateway is overloaded.

14. The method of claim 12 wherein:
the VPN connection between the private network and the cloud computing system is configured according to encapsulating security payload (ESP) protocol; and
creating the security logic group includes creating a security association (SA) between the private network and the cloud computing system.

15. The method of claim 12 wherein:
the VPN connection between the private network and the cloud computing system is configured according to encapsulating security payload (ESP) protocol;
creating the security logic group includes creating a security association (SA) between the private network and the cloud computing system the SA having a unique security parameter index (SPI); and
forwarding the portion of the network traffic includes forwarding packets containing the unique SPI of the created SA in a header field of the individual packets to the second instance.

16. The method of claim 12 wherein:
the VPN connection between the private network and the cloud computing system is configured according to encapsulating security payload (ESP) protocol;
creating the security logic group includes creating a security association (SA) between the private network and the cloud computing system the SA having a unique security parameter index (SPI);
forwarding the portion of the network traffic includes forwarding packets containing the unique SPI of the created SA in a header field of the individual packets to the second instance; and
the method further includes forwarding other packets to the first instance of the VPN gateway when the other packets containing another unique SPI corresponding to another SA in a header field of the individual other packets.

17. The method of claim 12 wherein:
the VPN connection between the private network and the cloud computing system is configured according to encapsulating security payload (ESP) protocol; and
creating the security logic group includes creating a security association between the private network and the cloud computing system by negotiating with the on-premise gateway for one or more of an encryption algorithm or an encryption key.

18. The method of claim 12, further comprising:
upon completion of creating the security logic group, instructing a load balancer in the cloud computing system to forward the additional packets based at least in part on the digital identifier of the created security logic group; and
forwarding the portion of the network traffic includes, at the load balancer,
inspecting the additional incoming packets for a value of the digital identifier; and
in response to determining that the value of the digital identifier corresponds to the created security logic group, forwarding the additional packets to the second instance of the VPN gateway.

19. The method of claim 12, further comprising:
upon completion of creating the security logic group, instructing a load balancer in the cloud computing system to forward the additional packets based at least in part on the digital identifier of the created security logic group; and forwarding the portion of the network traffic includes, at the load balancer, inspecting the additional incoming packets for a source address, a destination address, a protocol value, and a value of the digital identifier; and forwarding the additional packets to the second instance of the VPN gateway when a combination of the source address, the destination address, the protocol value, and the value of the digital identifier corresponds to the second instance according to a load balancing policy.

20. The method of claim 12, further comprising:

determining whether the second instance of the VPN gateway is overloaded for processing the portion of the network traffic from the private network based on the preset threshold; and in response to determining that the second instance is overloaded, creating another security logic group corresponding to another portion of the VPN network traffic between the private network and the cloud computing system; and upon completion of creating the another security logic group, forwarding the another portion of the network traffic to a third instance of the VPN gateway when a digital identifier of the created another security logic group is a part of each of further incoming packets.

* * * * *